Patented Dec. 13, 1938

2,140,042

UNITED STATES PATENT OFFICE 2,140,042

TANNING

John Arthur Wilson, Milwaukee, Wis., assignor to Hall Laboratories Inc., Pittsburgh, Pa., a corporation of Pennsylvania No Drawing. Application June 17, 1937, Serial No. 148,757

11 Claims. (Cl. 149—5)

This invention relates to the manufacture of leather, and more particularly to the pretannage of hides and skins with solutions of alkali-metal phosphates or their corresponding acids preparatory to their retannage with any of the other known tanning materials.

The preferred alkali-metal phosphate which I employ as pretanning agent is "Graham's salt", (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol. 21, page 922, 8th edition, Berlin, 1928); or "Graham's metaphosphate" (A Dictionary of Chemistry, by Henry Watts, vol. 4, page 578, New York, 1873; A Treatise on Chemistry, by Roscoe and Schorlemmer, vol. 2, part 1, page 283, New York, 1923). Graham's metaphosphate or salt is believed to consist principally of sodium hexametaphosphate. The sodium hexametaphosphate is assumed to be a complex of the general formula $Na_2(Na_4P_6O_{18})$, although some authorities believe that salts of the formula $Na_5(NaP_6O_{18})$ and $Na_4(Na_2P_6O_{18})$ may also be present.

Solutions which are similar to solutions of Graham's salt may be made by dissolving water-insoluble Maddrell salts or Kurrol salts in acid solution as described in the copending application of Casimir J. Munter, Serial No. 68,442, filed March 12, 1936. These solutions may be employed in place of the solution of Graham's salt as a pretanning agent.

Graham's salt which consists principally of sodium hexametaphosphate, is a glassy (non-crystalline) sodium hexametaphosphate. Sodium trimetaphosphate, on the other hand, is a crystalline material and although having an appreciable tanning action, is considerably less effective than Graham's salt. In fact, the trimetaphosphate has only approximately one-third the tanning effect of Graham's salt. Another alkali-metal phosphate which exerts some tanning action but which is even less effective than crystalline sodium trimetaphosphate, is sodium tripolyphosphate $(Na_5P_3O_{10})$. Sodium tripolyphosphate is a definite chemical compound distinct from sodium metaphosphate or sodium pyrophosphate and is not a mixture of the two. Sodium pyrophosphate has been found to have practically no tanning effect on animal skin.

The materials which I employ as pretanning agents in accordance with the present invention have the general formula $M_2O.P_2O_5$, in which M is hydrogen, ammonium and/or an alkali-metal, and in which the molar ratio of $M_2O$ to $P_2O_5$ is less than 2:1. In this formula, where M is hydrogen, the material is an acid, and where M is an alkali-metal or ammonium, it is a phosphate. Sodium metaphosphate $(NaPO_3)$, or sodium hexametaphosphate $(Na_6P_6O_{18})$ which is known as Graham's salt, have a molar ratio of $Na_2O$ to $P_2O_5$ of 1:1. Sodium tripolyphosphate $(Na_5P_3O_{10})$ has a molar ratio of $Na_2O$ to $P_2O_5$ of 5:3. Tetrasodium pyrophosphate $(Na_4P_2O_7)$ has a molar ratio of $Na_2O$ to $P_2O_5$ of 2:1, and trisodium orthophosphate $(Na_3PO_4)$ has a molar ratio of $Na_2O$ to $P_2O_5$ of 3:1. Neither the pyrophosphate nor the orthophosphate has an appreciable tanning action on animal skins and do not come within the scope of the present invention.

The phosphates employed in my invention are complete tanning agents in themselves and, when used alone, produce pure white leathers of phenomenal tensile strength, resistance to abrasion and tearing resistance and of remarkable tightness and fineness of grain and silkiness and length of fibers. I have found that these properties may be imparted, in large degree, to leathers of other tannages, which may be preferred for certain uses, by pretanning the stock with phosphate before applying the other tannage.

As a typical example of the use of this pretannage for vegetable-tanned leather, I give the method which I developed for vegetable-tanned goatskins. I put 1000 pounds of skins after bating, before tanning, into a drum, which is kept running during the entire period of tanning. I add 20 pounds of phosphorated cod oil and 40 pounds of sulfonated cod oil in 60 gallons water at 75° F. After 15 minutes, I add 40 pounds of Graham's salt in 20 gallons water at 75° F. After 2 hours, I add sulfuric acid slowly until the pH value of the liquor has been reduced to 2.5. Two hours after the last addition of acid, I add 400 pounds of solid quebracho extract in 250 gallons water at 75° F. When the quebracho has completely penetrated the stock, as shown by examining a cutting, I remove the leather from the drum and treat and finish it according to any one of the procedures employed for vegetable-tanned leather according to the type of leather desired.

The phosphate pretannage greatly accelerates the tannage with quebracho and yields a leather that is much stronger, more durable, of lighter and more uniform color and of finer feel than is obtained when quebracho is used without the phosphate pretannage.

For chrome-tanned leather, I proceed exactly as for the vegetable-tanned leather up to and including the addition of Graham's salt. After 2 hours, I add sulfuric acid slowly until the pH value of the liquor has been reduced to 2.0. Four hours after the last addition of acid, I drain off the liquor and wash the stock in running water for 1 hour to remove uncombined phosphate. I drain off the excess water and add basic chromium sulfate equivalent to 20 pounds of chromic oxide and 25 pounds of sodium chloride in 100 gallons water at 75° F. After 2 hours, I add sodium bicarbonate slowly over an hour to raise the pH value of the liquor to 3.25. Three hours after the last addition of bicarbonate, I remove the leather from the drum, pile it and allow it to stand for 24 hours. I then treat and finish it according to any one of the procedures employed for chrome-tanned leather according to the type of leather desired.

The resulting leather is more durable, of lighter color and finer feel than is obtained with chrome tanning alone.

For alum-tanned leather, I proceed exactly as for chrome-tanned leather up to and including the washing operation after the phosphate tannage. I drain off the excess water and add 125 pounds of aluminum sulfate and 60 pounds of sodium chloride in 125 gallons of water at 75° F. After 3 hours, I add sodium carbonate slowly over a period of 1 hour to raise the pH value to 3.95. Three hours after the last addition of carbonate, I remove the leather from the drum, pile it and allow it to stand for 24 hours. I then treat and finish it according to any one of the procedures employed for alum-tanned leather according to the type of leather desired.

Instead of employing either Graham's salt or other of the phosphate alone as the pretanning agent, I may employ mixtures of these phosphates, although, because of their superior tanning properties, the metaphosphates and particularly Graham's salt are the preferred pretanning agents.

I have given certain examples of the manner in which my invention may be carried out. Many variations in procedure may be made in order to make the product more suitable for special uses and the invention may be otherwise embodied or practiced within the scope of the following claims.

I claim:

1. A method of tanning animal skin, which comprises pretanning the skin with a solution of a tanning agent of the formula $M_2O.P_2O_5$, in which M is hydrogen, ammonium and/or an alkali-metal, and in which the molar ratio of $M_2O$ to $P_2O_5$ is less than 2:1, and thereafter retanning the skin with a solution of another tanning agent.

2. A method of tanning animal skin, which comprises pretanning the skin with a solution of a tanning agent of the formula $M_2O.P_2O_5$, in which M is hydrogen, ammonium and/or an alkali-metal, and in which the molar ratio of $M_2O$ to $P_2O_5$ is less than 2:1, and thereafter retanning the skin with a solution of a vegetable tanning agent.

3. A method of tanning animal skin, which comprises pretanning the skin with a solution of a tanning agent of the formula $M_2O.P_2O_5$, in which M is hydrogen, ammonium and/or an alkali-metal, and in which the molar ratio of $M_2O$ to $P_2O_5$ is less than 2:1, and thereafter retanning the skin with a solution of a chromium compound.

4. A method of tanning animal skin, which comprises pretanning the skin with a solution of a tanning agent of the formula $M_2O.P_2O_5$, in which M is hydrogen, ammonium and/or an alkali-metal, and in which the molar ratio of $M_2O$ to $P_2O_5$ is less than 2:1, and thereafter retanning the skin with a solution of an aluminum compound.

5. A method of tanning animal skin, which comprises pretanning the skin with a solution of Graham's salt, and thereafter retanning the skin with a solution of another tanning agent.

6. A method of tanning animal skin, which comprises pretanning the skin with a solution of Graham's salt, and thereafter retanning the skin with a solution of a vegetable tanning agent.

7. A method of tanning animal skin, which comprises pretanning the skin with a solution of Graham's salt, and thereafter retanning the skin with a solution of a chromium compound.

8. A method of tanning animal skin, which comprises pretanning the skin with a solution of Graham's salt, and thereafter retanning the skin with a solution of an aluminum compound.

9. A method of tanning animal skin, which comprises pretanning the skin with a solution of a tanning agent of the formula $M_2O.P_2O_5$, in which M is hydrogen, ammonium and/or an alkali-metal, and in which the molar ratio of $M_2O$ to $P_2O_5$ is less than 2:1, and thereafter retanning the skin with a solution of a vegetable tanning agent at a pH value below 3.5.

10. A method of tanning animal skin, which comprises pretanning the skin with a solution of a tanning agent of the formula $M_2O.P_2O_5$, in which M is hydrogen, ammonium and/or an alkali-metal, and in which the molar ratio of $M_2O$ to $P_2O_5$ is less than 2:1, the pretanning solution having a pH value below 3.5, and thereafter retanning the skin with a solution of a vegetable tanning agent at a pH value below 3.5.

11. A method of tanning animal skin, which comprises pretanning the skin with a solution of Graham's salt at a pH value below 3.5, and thereafter retanning the skin with a solution of a vegetable tanning agent at a pH value below 3.5.

JOHN ARTHUR WILSON.